United States Patent [19]
Sweet et al.

[11] 3,782,753
[45] Jan. 1, 1974

[54] PNEUMATIC SUSPENSION UNIT

[75] Inventors: Phillip J. Sweet; Buck C. Hamlet; David L. Sweet, all of Fresno, Calif.

[73] Assignee: American Carrier Equipment, Fresno, Calif.

[22] Filed: June 19, 1972

[21] Appl. No.: 263,965

[52] U.S. Cl. ................. 280/124 F, 267/18, 267/31
[51] Int. Cl. ............................................ B60g 11/46
[58] Field of Search ................. 280/124 F; 267/31, 267/18, 24

[56] References Cited
UNITED STATES PATENTS
2,874,956  2/1959  La Belle .......................... 267/31 X
3,309,107  3/1967  Chieger .......................... 267/31 X
3,237,957  3/1966  Harbers .......................... 267/18 X
3,510,149  5/1970  Raidel ............................ 267/18 X

*Primary Examiner*—Philip Goodman
*Attorney*—Herbert A. Huebner et al.

[57] ABSTRACT

A pneumatic suspenion unit adapted to be interposed as a fabricated unit between a load-bearing frame and wheel-supported axle of a highway vehicle. The unit is characterized by an integrated pair of laterally spaced single convolute air springs to be supported in vertical alignment between a vehicle's axle and its load-bearing frame, and a pair of laterally cantilevered springs, the bases of which are to be fixed to the axle while the distal ends thereof are supported through a hanger in a fixed relationship with the frame, whereby brake-induced rotation of the axle, relative to the frame, is impeded.

3 Claims, 7 Drawing Figures

PATENTED JAN 1 1974  3,782,753

PNEUMATIC SUSPENSION UNIT

BACKGROUND OF THE INVENTION

The invention relates to suspension systems and more particularly to a fabricated pneumatic suspension unit to be interposed in coplanar relation with a load-bearing frame and a wheel-supported axle of a highway vehicle.

It is, of course, common practice to provide highway vehicles such as trucks, trailers and the like with suspension systems which serve to transfer loads from a load-supporting frame to the vehicle's axle, and for absorbing applied shock as the vehicle traverses an uneven surface. Among such systems are coil springs, leaf springs, and pneumatic systems which employ the so-called air spring.

The use of leaf springs, coil springs and the like, in such systems generally is inefficient and tends to increase the overall weight of the vehicle. The increased weight necessarily tends to decrease the efficiency of the vehicle's operation and reduces its overall load transporting capabilities. Therefore, excessive weight is highly undesirable.

Attempts have been made to utilize the so-called commercially available "air springs" in order to reduce the weight of suspension systems. Such attempts have not eliminated the requirement of leaf springs since the leaf springs normally are coupled at one end to the vehicle's frame and at the other end to an air spring interposed between the spring and the vehicle's frame. As can readily be appreciated, the use of an air spring at one end of a leaf spring does not provide an entirely satisfactory solution to the problem of reducing the total mass of the suspension system while providing a suitable shock-absorbing or cushioning effect for a highway vehicle.

It is therefore the purpose of the instant invention to provide an improved, pneumatic suspension unit through which the desirable characteristics of air springs are more fully realized and one which can readily be incorporated within existing highway vehicles with minimal ease.

OBJECTS AND SUMMARY OF THE INVENTION

It is therefore an object of the instant invention to provide an improved pneumatic suspension unit which overcomes the aforementioned difficulties.

It is another object to provide an improved pneumatic suspension unit particularly suited for use in supporting load-bearing frames provided for highway vehicles.

It is another object to provide an improved pneumatic suspension unit which readily can be interposed between a load-bearing frame and the axle of a highway vehicle.

It is another object to provide a pneumatic suspension unit which includes an air spring interposed in vertical alignment between a load-supporting frame and a dead axle of a highway vehicle.

These and other objects and advantages are achieved through a suspension unit including an integrated pair of commercially available, single convolute air springs adapted to be interposed in vertical alignment between an axle and a load-bearing frame of a highway vehicle, as will hereinafter become more readily apparent by reference to the following description and claims in light of the accompanying drawings.

DESCRIPTION OF THE PREFERRED EMBODIMENT

Figure 1:
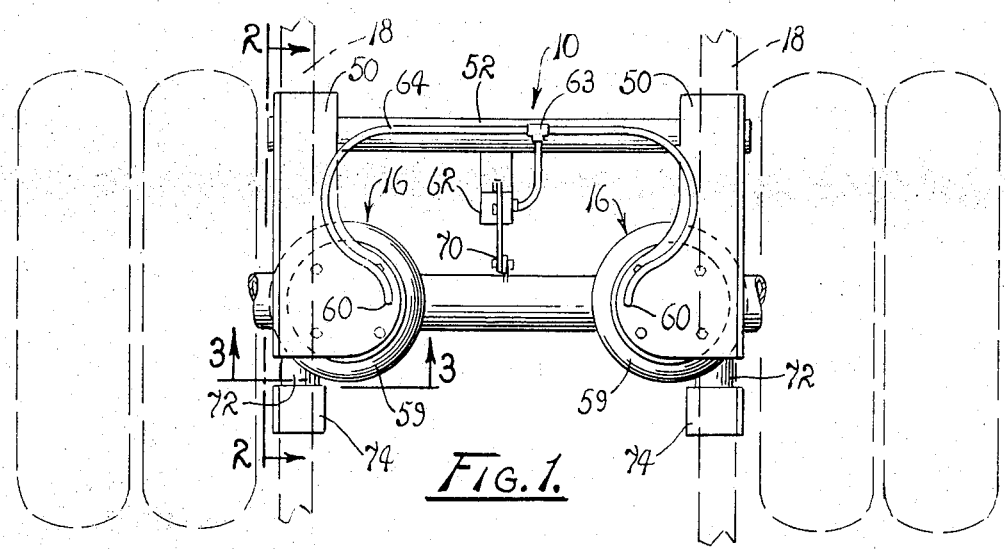
FIG. 1 is a top plan view of a pneumatic suspension unit, including an air spring, which embodies the principles of the instant invention.
Figure 2:
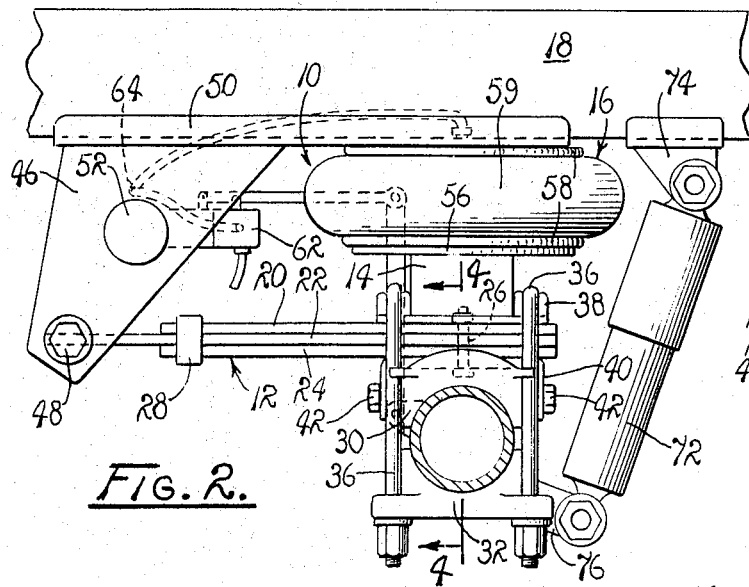
FIG. 2 is a fragmented, partially sectioned elevation, taken generally along line 2—2 of FIG. 1.
Figure 3:
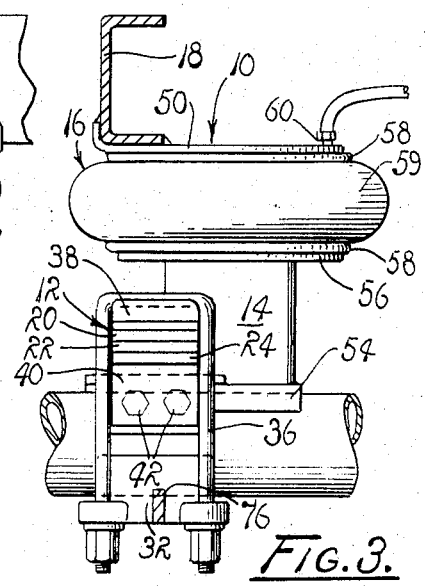
FIG. 3 is a fragmented, partially sectioned end elevation, taken generally along line 3—3 of FIG. 1.

Referring now to the drawings wherein like reference characters designate like or corresponding parts throughout the several views, there is shown in FIG. 1 a pneumatic suspension unit 10 embodying the principles of the instant invention.

It will, of course, readily be appreciated that the suspension unit 10 can, where so desired, be employed in supporting vehicle frames on "live" axles. However, the suspension unit 10 preferably is utilized in supporting load-bearing frames of vehicles such as trailers and the like which do not necessarily include live axles.

Furthermore, while the suspension unit 10 readily can be employed in fabricating "new" vehicles, it particularly is to be understood that the suspension unit 10 preferably is provided as an integrated unit and employed as a replacement for suspension systems currently utilized in supporting the load-bearing frames of highway vehicles. When so employed, a vehicle such as a trailer is elevated, its suspension system removed, and the unit 10 inserted in its place. Accordingly, it should be apparent that the pneumatic suspension unit 10 can be employed with both new and used wheels and axles.

The unit 10 includes a pair of laterally spaced cantilevered springs 12, which function as torque dissipating radius arms, only one of which is shown, a pair of laterally spaced base pillars 14, one of which also is shown, and a pair of air springs 16 seated upon the pair of pillars 14. Upon the pillars 14 is seated a load-bearing frame 18 provided for a vehicle with which the suspension unit is to be employed.

Each of the cantilevered springs 12, in practice, includes three foreshortened leaf components 20, 22 and 24, of a known configuration, supported in superimposed relationship and bolted together by a suitable bolt-and-nut combination 26. The bolt of the bolt-and-nut combination 26 is extended through coaxially related openings, not designated, formed in the leaf components while a banding clamp 28 circumscribes the distal end portion of the cantilevered spring 12. Thus, the cantilevered springs 12 are of a similar design and are integrated into a single unit through a use of the bolt-and-nut combination 26 and the banding clamp 28.

When mounted on a given axle, each of the cantilevered springs 12 is secured to the axle employing a pair of pillow pads 30 and 32 having opposed recesses 34 within which is received the axle upon which the spring 12 is mounted. As a practical matter, a pair of U-bolts 36 and spacer pads 38 are employed to cooperate with the pillow pads 30 and 32 for coupling the spring 12 with the axle.

As a practical matter, each of the pillow pads 30 is received within a U-shaped adjustment bracket 40 also affixed to one of the cantilevered springs 12. This bracket is provided with a setscrew 42 extended through each of its opposite ends and threaded into the pillow pad 30. Between the adjacent surfaces of the pillow pads 30 and the adjustment bracket 40 there is provided a plurality of shims 44. The shims 44 are utilized in varying the positioning of the cantilevered spring 12 relative to the longitudinal axis of the axle. It is to be understood that simply by varying the number of shims 44, at the opposite ends of the pillow pads 30, the longitudinal position of the cantilevered springs 12 is varied with respect to the axis of the axle. Thus alignment of the wheels employed in supporting the axle, relative to the unit 10, can be varied as is found desirable.

The distal end of each of the springs 12 is affixed to a suspended hanger bracket 46, preferably through a pivot pin 48. It will therefore be appreciated that the distal end portions of the cantilevered springs 12 are, in practice, afforded rotation about an axis extending transversely of the unit 10. This rotation accommodates a flexing of the cantilevered springs 12, particularly when the brakes of the wheels supporting the axle are applied.

As is best shown in FIG. 1, the unit 10 also includes a pair of laterally spaced receiver plates 50 which serve to receive thereon the frame 18. These plates are spaced a distance dictated by the length of a transverse support beam 52 rigidly fixed to the hangers 46. Preferably, the spacing of the receiver plates 50 accommodates a reception of frames 18 of various widths. Of course, the frame 18 is welded or otherwise suitably secured to the receiver plates 50 so that the receiver plates 50, the frame 18 and the hanger 46 are integrated into a unitary configuration.

Figures 4, 5, 6, 7:
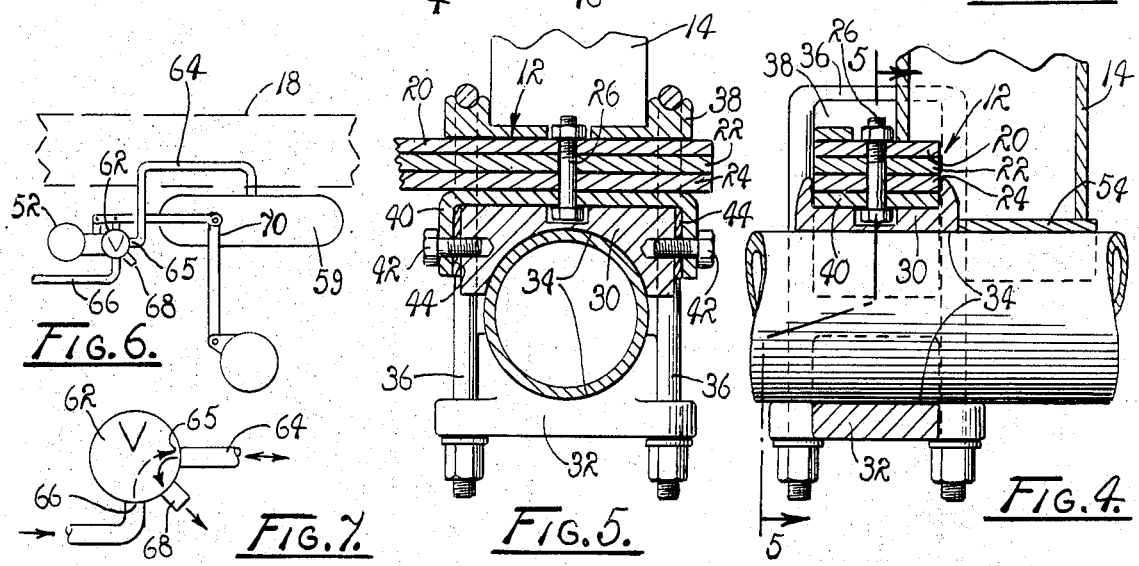
FIG. 4 is a fragmented, sectioned view, taken generally along line 4—4 of FIG. 2, on somewhat of an enlarged scale.
FIG. 5 is a fragmented, sectioned elevation, taken generally along line 5—5 of FIG. 4.
FIG. 6 is a fragmented view of a system including a valve employed in controlling pressurization of the air spring.
FIG. 7 is a flow diagram illustrating the operation of the valve shown in FIG. 6.

Each of the base pillars 14 is supported by a saddle block 54 received by the aforementioned axle and welded thereto. The base pillars 14 preferably are of a tubular configuration and are cast, or machined, to provide a suitable relief, not designated, which receive therein adjacent portions of the base of the cantilevered spring 12, as best shown in FIG. 4. The uppermost portions of the base pillars 14 are provided with support plates 56 upon which are seated the air springs 16. The air springs 16 are provided with a pair of opposed support plates 58, the lowermost plates being seated upon the support plates 56, while the uppermost plates serve to support the receiver plates 50. In practice, the plates 50 and 56 are welded to the plates 58, however, the particular manner in which the plates are united is deemed to be a matter of convenience.

The air springs 16 are of a known design and frequently are referred to as single convolute air springs. These air springs include bags 59 fabricated from a neoprene or similar material and adhesively fixed between the pair of base plates 58. Each of the bags 59 is provided with a suitable pneumatic fitting 60 through which air is introduced into and evacuated from the bag.

The fittings 60, in turn, are coupled with a selector valve 62 through a T-fitting 63 which couples lengths of tubing into a flexible conduit 64 extending from the bags 59 to the valve 62. The selector valve 62 is provided with a delivery port 65 for charging the air bags and with a pressure port 66, FIG. 7, for receiving air under pressure. The port 65 communicates with the conduit 64, while the port 66 communicates with a source of air maintained under an elevated pressure.

The source of air preferably is a source such as that commonly employed by so-called tractor-trailer vehicles for furnishing air to brakes and the like. The valve 62 is further provided with an exhaust port 68 through which the air springs 16 are evacuated.

In practice, the valve 62 is activated for charging and evacuating the bags 59 by a pivotal linkage 70 having one end thereof fixed to the axle and the opposite end thereof coupled with an actuator, not designated, provided for the valve 62. Thus vertical displacement of the axle relative to the frame 18, acting through the linkage 70, serves to displace the actuator for the valve 62. In practice, a downward motion of the axle, relative to the frame 18, causes the ports 65 and 68 to be brought into alignment, whereby air is evacuated from the bags 59 of the air springs 16. Similarly, an upward movement of the axle relative to the frame 18 causes the ports 65 and 66 to be aligned, through a responsive movement of the linkage 70 for thus delivering air from the source to the bags of the springs 16 whereupon the bags are charged. Accordingly, it should readily be apparent that the volume of the air confined within the air springs 16 remains substantially constant and that the pressure thereof is varied in accordance with the instantaneous position of the axle relative to the frame 18.

As a practical matter, a pair of suitable shock absorbers 72 is provided for coupling the frame 18 and the axle, through brackets 74 and 76 affixed to the opposite ends of the shock absorber.

In view of the foregoing, it should readily be appreciated that the pneumatic suspension unit 10 is an integrated unit which can readily be incorporated within operative fleet vehicles or, alternatively, can be incorporated within vehicles during their fabrication.

OPERATION

It is believed that in view of the foregoing description, the operation of the device will readily be understood and it will be briefly reviewed at this point.

With the pneumatic suspension unit 10 assembled in an integrated unit, in the manner hereinbefore described, it is readied to be interposed between the axle of a vehicle and its load-supporting frame. In order to install the suspension unit 10, the frame 18 is elevated and the existing suspension system, not shown, removed. The suspension unit 10 is then coupled with the vehicle's axle and thereafter mated with a load-bearing frame 18. The unit 10 and the frame 18 are welded or otherwise united into an integrated unit.

As a vehicle equipped with the unit 10 of the instant invention is advanced, unevenness of the highway road or similar surfaces causes the axle to be displaced relative to the frame 18 in vertical directions. As the axle drops downwardly, relative to the frame, for permitting the weight borne by the suspension unit 10 momentarily to be removed, air is exhausted from the bags 59 of the air spring 16. Conversely, as the axle is advanced upwardly, toward the frame 18, for thus increasing the weight of the load borne by the air spring 16, the linkage 70 actuates the valve 62 for causing the valve to deliver additional air to the bags 59.

Since the operation of air springs is well known, a detailed description thereof is omitted in the interest of brevity. However, it is to be understood that through the linkage 70 the valve 62 is actuated in response to vertical motion of the axle for thus maintaining the pressure within the air spring at a preselected level.

In view of the foregoing, it should readily be apparent that the pneumatic suspension unit of the instant invention is of a simple, lightweight construction, eaSy to install and effective in operation.

Although the invention has been herein shown and described in what is conceived to be the most practical and preferred embodiment, it is recognized that departures may be made therefrom within the scope of the invention, which is not to be limited to the illustrative details disclosed.

Having described our invention, what we claim as new and desire to secure by Letters Patent is:

1. A unitized suspension unit adapted to receive in supporting engagement a load-bearing frame of a highway vehicle comprising:
   A. a wheel-supported axle;
   B. a pair of elongated, rigid base pillars arranged in mutually spaced parallelism;
   C. mounting means for coupling said pair of base pillars to said wheel-supported axle in a substantially vertical disposition;
   D. force dissipating means including a single convolute air bag supported by each base pillar of said pair in a substantially vertical alignment with said axle;
   E. receiver means for receiving thereon a load-bearing frame of a highway vehicle, including a pair of laterally spaced substantially horizontally oriented support plates, each of said plates being of a planar configuration and supported by an air bag and having suspended therefrom a hanger;
   F. a pair of radius arms, each including a cantilevered spring;
   G. means for coupling one end of each of said arms with said axle, and means for coupling the opposite end thereof with a hanger suspended from one of said plates for dissipating torque applied to said axle; and
   H. means including a transverse beam extended between said hangers and rigidly connected therewith for integrating said axle, air bags, leaf springs and receiver means into an integrated unit.

2. The unit of claim 1 further comprising valve means coupled with said air bags responsive to vertical motion imparted to said axle, relative to said receiver means, for delivering and exhausting gas from said chambers.

3. The unit of claim 2 wherein said valve means includes:
   A. a selector valve having a pressure port coupled with a pressurized source of gas, an exhaust port vented to atmosphere and a fluid delivery port coupled with said pair of air springs; and
   B. an actuator linkage extended from said axle to said valve for coupling the pair of air springs with said source of gas through said fluid delivery port when motion in a first direction is imparted to said axle, and for evacuating said air springs through said exhaust port when motion in an opposite direction is imparted to said axle.

* * * * *